United States Patent
Schnuell et al.

(10) Patent No.: US 8,111,456 B2
(45) Date of Patent: Feb. 7, 2012

(54) STAGE DRIVE FOR MICROSCOPES

(75) Inventors: Peter Schnuell, Gleichen (DE);
Christian Boeker, Gleichen (DE)

(73) Assignee: Carl Zeiss Microimaging GmbH, Jena (DE)

( * ) Notice: Subject to any disclaimer, the term of this patent is extended or adjusted under 35 U.S.C. 154(b) by 266 days.

(21) Appl. No.: 12/518,412

(22) PCT Filed: Dec. 18, 2007

(86) PCT No.: PCT/EP2007/011114
§ 371 (c)(1),
(2), (4) Date: Jun. 9, 2009

(87) PCT Pub. No.: WO2008/077531
PCT Pub. Date: Jul. 3, 2008

(65) Prior Publication Data
US 2010/0014159 A1  Jan. 21, 2010

(30) Foreign Application Priority Data
Dec. 22, 2006 (DE) .................. 10 2006 061 067

(51) Int. Cl.
*G02B 21/26* (2006.01)
(52) U.S. Cl. ........................ 359/393; 359/391
(58) Field of Classification Search .......... 359/391–394, 359/368
See application file for complete search history.

(56) References Cited

U.S. PATENT DOCUMENTS

| 4,766,465 A * | 8/1988 | Takahashi ................ 355/53 |
| 5,040,431 A * | 8/1991 | Sakino et al. ............. 74/490.09 |
| 5,768,013 A | 6/1998 | Kraft |
| 6,313,945 B1 * | 11/2001 | Takeuchi .................. 359/393 |
| 7,233,435 B2 | 6/2007 | Gilbert et al. |
| 7,324,275 B2 | 1/2008 | Bonaventura et al. |
| 2003/0169492 A1 * | 9/2003 | Nishida et al. ............. 359/393 |

FOREIGN PATENT DOCUMENTS

| DE | 35 14 431 A1 | 1/1986 |
| DE | 195 32 008 C2 | 3/1997 |
| DE | 103 40 721 B3 | 3/2005 |
| DE | 10 2004 053 437 A1 | 6/2005 |
| DE | 10 2004 056 531 A1 | 6/2005 |
| EP | 1 085 292 A1 | 3/2001 |
| JP | 2002-196256 A | 7/2002 |

* cited by examiner

*Primary Examiner* — Thong Nguyen
(74) *Attorney, Agent, or Firm* — Patterson Thuente Christensen Pedersen P.A.

(57) ABSTRACT

A stage drive for moving a microscope stage designed as a mechanical stage including a first drive element linked to a first output element, and a second drive element, which is linked to a second output element. Through first and second transmission elements, the first output element is linked to a first stage element and the second output element is linked to a second stage element of the mechanical stage supported by the first stage element. The stage elements are supported so as to be displaceable relative to a fixed base element in orthogonal directions X, Y in a plane extending normal to the optical axis of the microscope beam path. The at least one stage drive includes at least one drive element and at least one output element and is arranged in the base element so as to be displaceable in X direction and/or Y direction within an adjustment range and lockable.

4 Claims, 2 Drawing Sheets

STAGE DRIVE FOR MICROSCOPES

PRIORITY CLAIM

The present application is a National Phase entry of PCT Application No. PCT/EP2007/011114, filed Dec. 18, 2007, which claims priority from German Application Number 102006061067.9, filed Dec. 22, 2006, the disclosures of which are hereby incorporated by reference herein in their entirety.

FIELD OF THE INVENTION

The invention relates to a stage drive for microscopes for moving a microscope stage in at least one direction in a plane situated normal to the optical axis of the microscope beam path.

BACKGROUND OF THE INVENTION

In the common mechanical stages of upright and inverted microscopes, the two coordinate motions X and Y of the stage carrying the specimen are implemented by a coaxial drive mechanism via suitable means of transmission, with the coaxial drive mechanism for the X motion remaining stationary. During Y motion, the coaxial drive mechanism moves along in the Y direction, which is ergonomically unfavorable. For the user, this means that, as the specimen is being moved, the distance between the stage drive and the focusing drive knob constantly changes. Therefore, among other things, it is hardly possible to actuate both control elements with one hand. An ergonomically optimum solution would be to have a stage drive the position of which could be adjusted by the user, and which would then remain stationary during the X and Y motions of the microscope stage.

A coaxial drive mechanism for a microscope specimen stage, designed as a mechanical stage, is known from DE 195 32 008 C2. It comprises a stationary guideway for two stage elements which are displaceable relative to each other horizontally in orthogonal displacement directions, and control elements that are linked to the said stage elements, can be rotated about a coaxial axis and will maintain their position in space during a displacement of the two stage elements in X and/or Y direction. For displacing a stage element, means for force transmission in the form of toothed belts, ropes or levers that carry toothed-gear or friction-gear chains are provided, which transmit the torque created by the associated control element to this one stage element so as to displace it in the associated displacement direction. While this specimen stage features a stationary arrangement of the control elements for stage movement, individual positioning of the control element is not possible.

In a microscope stage drive described in DE 35 14 431, two slides, which are movable normally to each other and perpendicularly to the optical axis, are provided together with associated drive elements, the output links of which are mounted coaxially. Force transmission between the output links of the drive elements and the associated slides is effected via pulling means running over turn pulleys.

In the microscope specimen control device disclosed in DE 10 2004 056 531 A1, the control means provided for moving the microscope stage is also arranged stationary.

SUMMARY OF THE INVENTION

In these known solutions involving stationary stage controls, the said distances remain constant, though with the disadvantage that the manufacturers provide a fixed position for the stage drive axis. Thus, neither the distance between the stage drive and the front side of the instrument nor the distance between the stage drive and the focusing knob can be adapted to individual requirements. By contrast, it would be advantageous to have a constant position of the coaxial controls and, thus, a fixed distance from a Z control acting in the direction of the optical axis, e.g., of the beam path of the respective instrument, provided that this distance can be adapted by the user to his/her individual requirements, i.e., in most cases to a position next to the microscope's focusing control that provides a focusing motion in the direction of the optical axis.

The problem of the invention is to create a microscope stage drive with drive elements and output elements, the position of which can be adjusted in the X and Y directions to suit the user's individual and/or ergonomic requirements, and which can be fixed in a stationary position.

An advantageous embodiment of the invention results if a first slide is mounted in guideways in the base element so as to be displaceable and lockable in a first direction, and if a second slide is arranged in guideways in the first slide so as to be displaceable and lockable in a second direction that is orthogonal to the first direction, and if the stage drive is arranged on the second slide.

Another embodiment of the invention results if a first lever is arranged in the base element so as to be rotatable about a vertical first axis of rotation, and if a second lever is mounted in a pivot joint at the other end of the first lever, i.e. the end opposite to the first axis of rotation so as to be rotatable and lockable, with the stage drive being arranged to the other end of the said liver, i.e. the one that is opposite to the pivot joint.

In order to implement a backlash-free and easy-glide motion of the stage carrying the specimen by the actuation of the drive element and, thus, the output element of the stage drive, it is of advantage to provide, for the transmission of forces or torques from the output element to the first and the second stage element, flexible drives, pinion drives, friction-gear drives or drives that are combinations of these drives.

With the stage drive designed according to the invention, the user can, in a simple way, move the stage drive to the position that is ergonomically most favorable, and arrest it in this position.

BRIEF DESCRIPTION OF THE DRAWINGS

Below, the invention will be explained in more detail in an exemplary embodiment and with reference to the accompanying drawings in which.

DETAILED DESCRIPTION

Figure 1:
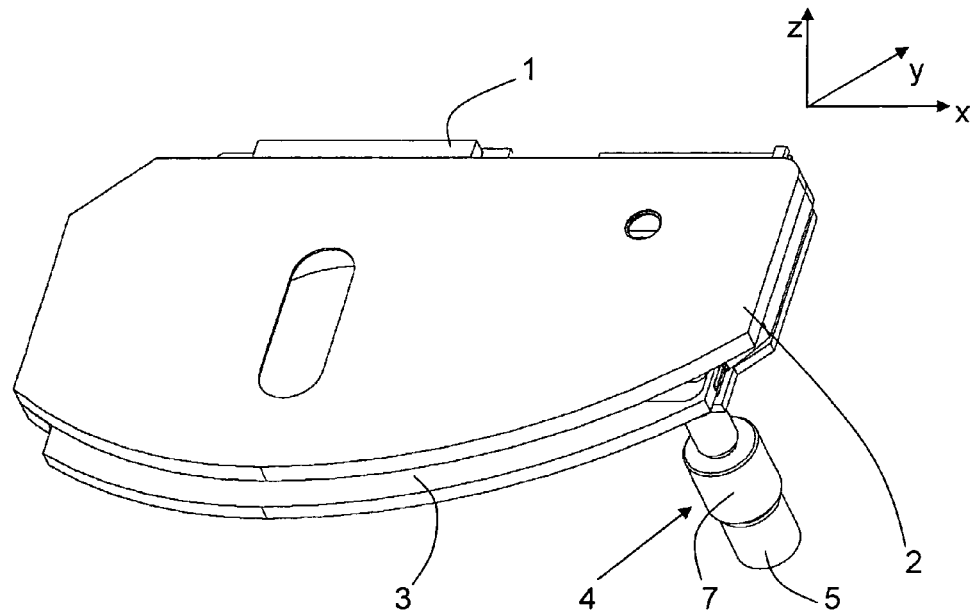
FIG. 1 is a top view of a microscope stage equipped with a stage drive according to the invention.

FIG. 1 is a top view of an adjustable microscope stage designed as a mechanical stage and equipped with a stage drive according to the invention. This microscope stage comprises a first stage element 1 with which the specimen to be observed can be moved in a suitable way. This stage element 1 is mounted in guideways provided on a second stage element 2 so as to be displaceable in a direction X. The second stage element 2 is mounted in guideways provided on a base element 3 so as to be displaceable in a direction Y that is perpendicular to the X direction, the base element being adjustable at the microscope stand in the direction of the optical axis of the microscope beam path, e.g. for the purpose of focusing. The X and Y coordinates lie in a plane that is perpendicular to the optical axis of the microscope beam path.

For displacing the first stage element 1 and the second stage element 2, the invented stage drive 4 is provided.

This stage drive 4 comprises a first drive element 5, which is linked to a first output element 6, and a second drive element 7, which is linked to a second output element 8, with the said drive elements 5 and 7 and the output elements 6 and 8 advantageously being arranged in a coaxial manner. The first output element 6 is linked to the first stage element 1 by first transmission means 11, and the second output element 8 is linked to the second stage element 2 of the mechanical stage (mounted on the first stage element 1) by second transmission means 12.

Figure 2:
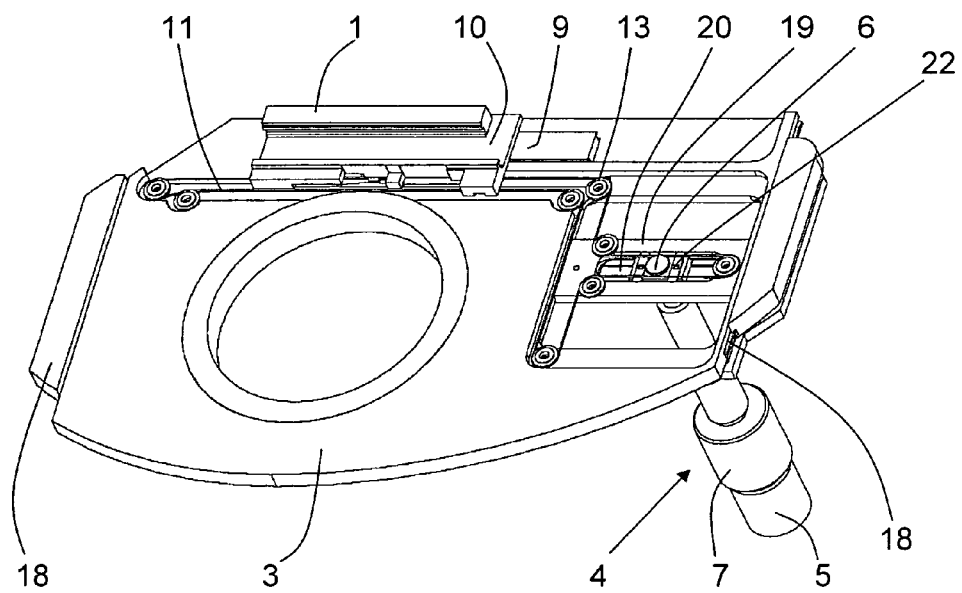
FIG. 2 is a top view of the stage with the upper stage element removed.

FIG. 2 is a top view of the stage with the top, first stage element 1 removed. The second stage element 2 has a guideway 9 extending in X direction, on which an intermediate part 10 is displaceably mounted, to which the first transmission means 11 is rigidly connected. Rigidly arranged to this intermediate part 10 is the first stage element 1. In the embodiment shown in FIG. 2, the first transmission means 11 is, for example, a rope or tape that is run over pulleys 13 and reversed in a suitable way. By rotating the first drive element 5, which is configured as a rotary knob, the intermediate part 10 and, thus, the first stage element 1 can be displaced along the guideway 9 in X direction, by means of the first output element 6 and the first transmission means 11.

Figure 3:
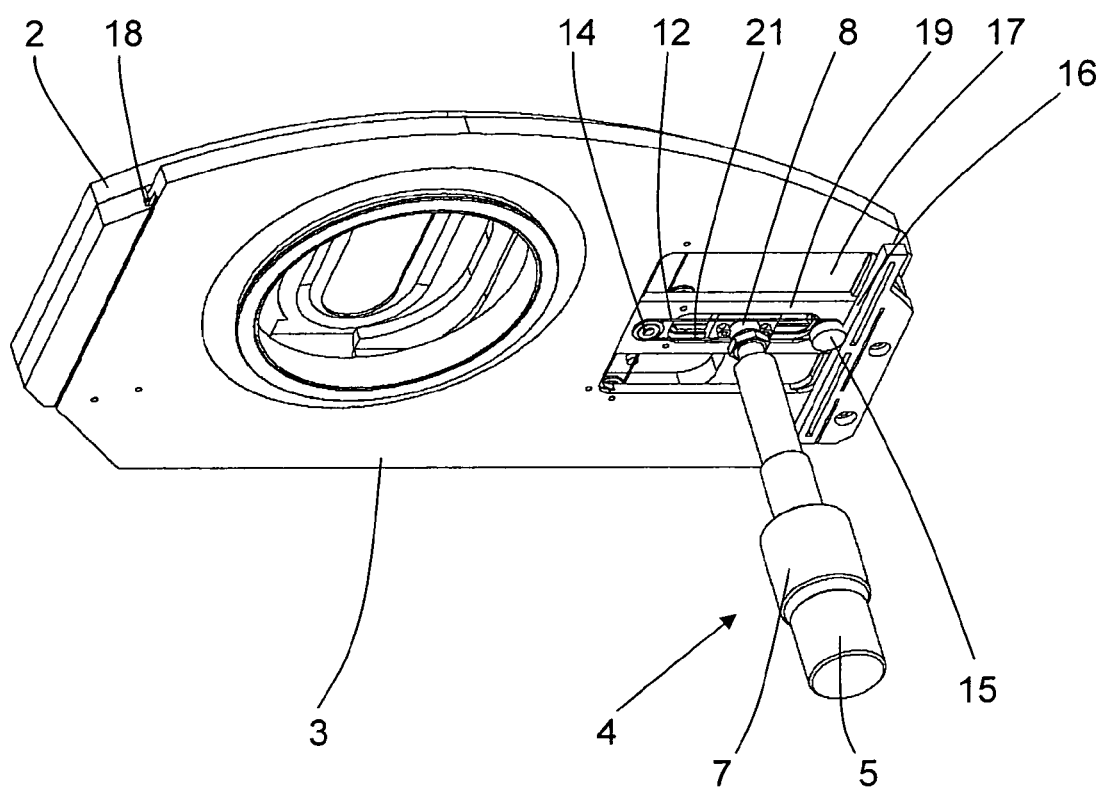
FIG. 3 is a view of the stage from below, with drive elements.

As can be seen in FIG. 3, the second stage element 2 is mounted in guideways 16 of the base element 3 so as to be displaceable in the Y direction. This can be accomplished by rotation of the second drive element 7 (also configured as a rotary knob) by way of the second output element 8 and the second transmission means 12, which is linked, e.g., to a friction gear or a pinion 15 of a friction or rack-and-pinion drive, which acts together with a friction surface of the second stage element 2 or with a rack 16 provided on the second stage element 2.

The base element 3 has a recess 17 with guideways 18, in which a first slide 19 is arranged so as to be displaceable and lockable in the Y direction. This first slide 19 has, in a recess 20, guideways 21 extending in the X direction, in which a second slide 22 is mounted so as to be also displaceable and lockable. The stage drive 4 is arranged on this second slide 22. By the displacement of these slides 19 and 22 in the guideways 18 and 21 assigned to them, the position of the stage drive 4 can be adjusted within a certain range according to the user's ergonomic requirements, and locked.

Another embodiment of the invention, which is not shown, results if, in a base element, a first lever is arranged so as to be rotatable about a vertical first axis of rotation, and a second lever is arranged in a pivot joint so as to be rotatable and lockable, at the other end of the first lever, i.e. the end opposite the first axis of rotation, with the stage drive being arranged at the other end of the said second lever, i.e. the end opposite the pivot joint. In this embodiment, the force and torque transmission from the first and second output elements to the first and second stage elements can be effected by the means described in conjunction with FIGS. 1 to 3 and in the manner described.

LIST OF REFERENCES 1 first stage element
2 second stage element
3 base element
4 stage drive
5 first drive element
6 first output element
7 second drive element
8 second output element
9 guideway
10 intermediate part
11 first transmission means
12 second transmission means
13, 14 pulley
15 pinion
16 rack
17 recess
18 guideway
19 first slide
20 recess
21 guideway
22 second slide

What is claimed is:

1. A mechanical microscope stage, comprising
a fixed base element;
a first stage element;
a second stage element supported by the first stage element; and
a stage drive;
wherein the first and second stage elements are supported to be displaceable relative to the fixed base element in orthogonal directions X and Y in a plane extending normal to an optical axis of a microscope beam path;
the stage drive comprising:
a first drive element linked to a first output element;
a second drive element linked to a second output element;
wherein the first output element is linked to the first stage element by a first transmission element and the second output element is linked to the second stage element by a second transmission element; and
wherein the stage drive is coupled to the fixed base element to be adjustable in location relative to the base element in the orthogonal directions X and/or Y within an ergonomic adjustment range; and
wherein the stage drive is lockable in the fixed base element in a selected ergonomically favorable adjustment position.

2. The mechanical microscope stage as claimed in claim 1, wherein the stage drive further comprises a first slide supported in first guideways in the base element so as to be displaceable in a first direction; and
a second slide supported in second guideways located in the first slide so as to be displaceable in a second direction orthogonal to the first direction; and
wherein the stage drive is supported by the second slide.

3. The mechanical microscope stage as claimed in claim 1 wherein the stage drive further comprises:
a first lever coupled to the base element so as to be rotatable about a vertical first axis of rotation, the first lever having a first end and a second end, the first end being proximate the vertical first axis of rotation, and
a second lever supported in a pivot joint proximate the second end of the first lever away from the first axis of rotation, so as to be rotatable about the pivot joint and lockable relative to the pivot joint, with the stage drive being arranged at an end of the second lever that is opposite the pivot joint.

4. The mechanical microscope stage as claimed in claim 1 wherein the stage drive further comprises flexible drives, pinion drives, friction gear drives and/or drives that are combinations of the foregoing transmitting forces or torques from at least one of the first and second output elements to the first and second stage elements.

* * * * *

UNITED STATES PATENT AND TRADEMARK OFFICE
CERTIFICATE OF CORRECTION

| | | |
|---|---|---|
| PATENT NO. | : 8,111,456 B2 | Page 1 of 1 |
| APPLICATION NO. | : 12/518412 | |
| DATED | : February 7, 2012 | |
| INVENTOR(S) | : Peter Schnuell and Christian Boeker | |

It is certified that error appears in the above-identified patent and that said Letters Patent is hereby corrected as shown below:

The Assignee was erroneously listed as "Carl Zeiss Microimaging GmbH" on the Part B – Fee(s) Transmittal.

On the title page, item [73] insert the following:

-- Assignee: Carl Zeiss MicroImaging GmbH --

Column 2, line 29 reads:
      "... of the said <u>liver</u>, i.e. the one that is opposite to the pivot joint."

should read as follows:
      -- of the said <u>lever</u>, i.e. the one that is opposite to the pivot joint. --

Signed and Sealed this

Seventh Day of August, 2012

David J. Kappos
*Director of the United States Patent and Trademark Office*